United States Patent
Kurasawa

(10) Patent No.: US 8,013,958 B2
(45) Date of Patent: Sep. 6, 2011

(54) LIQUID CRYSTAL DEVICE

(75) Inventor: Hayato Kurasawa, Matsumoto (JP)

(73) Assignee: Sony Corporation, Tokyo (JP)

( * ) Notice: Subject to any disclaimer, the term of this patent is extended or adjusted under 35 U.S.C. 154(b) by 906 days.

(21) Appl. No.: 11/987,102

(22) Filed: Nov. 27, 2007

(65) Prior Publication Data

US 2008/0204641 A1    Aug. 28, 2008

(30) Foreign Application Priority Data

Feb. 26, 2007  (JP) ................. 2007-045046

(51) Int. Cl.
  *G02F 1/1335*  (2006.01)
  *G02F 1/1343*  (2006.01)
(52) U.S. Cl. ......... 349/114; 349/117; 349/121; 349/141
(58) Field of Classification Search .................. 349/114, 349/117–121, 141
  See application file for complete search history.

(56) References Cited

U.S. PATENT DOCUMENTS

| | | | | |
|---|---|---|---|---|
| 6,141,075 | A * | 10/2000 | Ohmuro et al. | 349/130 |
| 6,630,973 | B1 * | 10/2003 | Matsuoka et al. | 349/117 |
| 6,937,308 | B2 | 8/2005 | Ishikawa et al. | |
| 7,812,905 | B2 * | 10/2010 | Sekiguchi et al. | 349/114 |
| 2004/0105059 | A1 * | 6/2004 | Ohyama et al. | 349/114 |
| 2007/0263148 | A1 * | 11/2007 | Teramoto et al. | 349/117 |

FOREIGN PATENT DOCUMENTS

| | | |
|---|---|---|
| JP | A 2003-279956 | 10/2003 |
| JP | A 2003-322855 | 11/2003 |
| JP | A-2004-094219 | 3/2004 |
| JP | A 2004-170867 | 6/2004 |
| JP | A 2005-300736 | 10/2005 |
| JP | A 2005-338256 | 12/2005 |
| JP | A-2006-171376 | 6/2006 |

* cited by examiner

*Primary Examiner* — Julie-Huyen L Ngo
(74) *Attorney, Agent, or Firm* — K&L Gates LLP

(57) ABSTRACT

A liquid crystal device which has a first and second electrodes formed on a second substrate and which controls allows alignment of liquid crystal molecules by an electric field generated between the first and second electrodes, wherein the liquid crystal molecules in the liquid crystal layer are aligned in a first direction in a plane of the substrate, wherein a phase difference layer having molecules, which are inclined in the plane of the first or second substrate and are aligned in directions different from one another in the transmissive display portion and the reflective display portion, is formed on a surface of the first or second substrate opposed to the liquid crystal layer, and wherein a director of the molecules of the phase difference layer is aligned in a second direction parallel to the first direction at least in the plane of the transmissive display portion, wherein an angle formed by the alignment direction of the molecules of the phase difference layer in the transmissive display portion and the alignment direction of the molecules of the phase difference layer in the reflective display portion is about 67.5°.

6 Claims, 14 Drawing Sheets

LIQUID CRYSTAL DEVICE

The entire disclosure of Japanese Patent Application No. 2007-045046, filed Feb. 26, 2007 is expressly incorporated by reference herein.

BACKGROUND

1. Technical Field

The present invention relates to a liquid crystal device used in a personal computer, a cellular phone, or the like and an electronic apparatus using the liquid crystal device.

2. Related Art

As a display device of an electronic apparatus such as a personal computer or a cellular phone, a liquid crystal device has been used. In addition, a transflective liquid crystal device is used to save electrical power in various circumstances such as outdoors or indoors.

Improvement in display quality or function of liquid crystal devices has been demanded. For example, in order to improve a wide viewing angle, an in-plane switching (ISP) mode or the like is also used in the transflective liquid crystal devices.

However, for example, when a phase plate is disposed over an entire surface of upper and lower surfaces of a liquid crystal panel, a viewing angle dependency occurs due to the phase plate. Accordingly, an optimum condition for a dark display may rapidly deteriorate as a viewing point moves away from a normal direction.

Therefore, there is disclosed a method in which a phase plate is disposed in a reflective display portion of the transflective IPS mode, a polarizing plate is commonly used in the reflective display portion and a transmissive display portion and disposed over an entire surface of upper and lower portions of the liquid crystal panel, and the phase plate is disposed on the inner surface of the liquid crystal panel to be formed only in the reflective display portion by performing patterning (for example, see JP-A-2005-338256 ([0013] and FIG. 2).

The wide viewing angle of the dark display of the transflective liquid crystal device is improved to some extent by the above-described method. However, it may not be easy to perform the patterning of the phase plate (phase difference layer) only in the reflective display portion. Moreover, the wide viewing angle of the dark display may not be sufficient.

SUMMARY

An advantage of some aspects of the invention is that it provides a liquid crystal device which can be easily manufactured and has an improved wide viewing angle by further preventing light leakage in a black display, and an electronic apparatus using the liquid crystal device.

According to an aspect of the invention, there is provided a liquid crystal device which has a liquid crystal layer interposed between a first substrate and a second substrate, a plurality of pixels each having a transmissive display portion and a reflective display portion, and first and second electrodes formed on the second substrate and which controls allows alignment of liquid crystal molecules in the liquid crystal layer by an electric field generated between the first and second electrodes, wherein the liquid crystal molecules in the liquid crystal layer are aligned in a first direction in a plane of the substrate, wherein a phase difference layer having molecules, which are inclined in the plane of the first or second substrate and are aligned in directions different from one another in the transmissive display portion and the reflective display portion, is formed on a surface of the first or second substrate opposed to the liquid crystal layer, and wherein a director of the molecules of the phase difference layer is aligned in a second direction parallel to the first direction at least in the plane of the transmissive display portion.

"A first electrode" refers to, for example, a pixel electrode and "a second electrode" refers to, for example, a common electrode. In addition, the term "inclined" refers to, for example, having a pretilt angle.

In the liquid crystal device with the above-described configuration, the phase difference layer is formed in the transmissive display portion and a reflective display portion of the liquid crystal layer of the first and second substrates. Accordingly, it is possible to solve difficulty in forming the phase difference layer only in the reflective display portion like in the known example and also reduce cost.

The alignment direction of the molecules of the phase difference layer in the transmissive display portion is different from that of the molecules of the reflective display portion. Accordingly, it is possible to minimize effect of the phase difference layer in the transmissive display portion.

For example, when substrate alignment of the phase difference layer is set so that alignment in the transmissive display portion is different from that in the reflective display portion (so called multiple alignments), the molecules of the phase difference layer have the pretilt angle. In this case, a problem arises in that a viewing angle characteristic, particularly, in an oblique direction may deteriorate.

In order to solve the problem, the director of the molecules is configured to be, for example, parallel or anti-parallel to the first direction which is the alignment direction of the liquid crystal molecules in the substrate surface, at least in the transmissive display portion. Accordingly, the light leakage in the black display is reduced even in the oblique view. By configuring the director to be parallel or anti-parallel to the first direction, in terms of the Poincare sphere, the sphere is a little swollen from the equator by the phase difference layer. The polarization state becomes elliptically polarized light close to the linearly polarized light, and thus the light leakage in the black display can be more suppressed. As a result, it is possible to obtain a wider viewing angle characteristic.

According to the liquid crystal device with the above-described configuration, a direction of the molecules in the phase difference layer inclined in the plane of the surface of the first or second substrate may be substantially equal to that of the liquid crystal molecules in the liquid crystal layer inclined in the plane of the surface of the first or second substrate. With such a configuration, in terms of the Poincare sphere, the sphere is less swollen from the equator by the phase difference layer, compared to a case where the director is configured to be anti-parallel. Accordingly, the polarization state becomes the elliptically polarized light close to the linearly polarized light, and thus the light leakage in the black display can be more suppressed. As a result, it is possible to obtain the wider viewing angle characteristic.

According to the liquid crystal device with the above-described configuration, the second substrate may have an insulating layer between the first and second electrodes. With such a configuration, when a voltage is applied, electric field formed between the first and second electrodes is considerably curved and the alignment direction of the liquid crystal molecules in the electrodes is controlled. In this way, it is possible to obtain the wider viewing angle characteristic.

According to the liquid crystal device with the above-described configuration, the first substrate may have a polarizing plate on the surface opposed to the liquid crystal layer and an absorption axis of the polarizing plate may be parallel to the first direction. With such a configuration, when a voltage is not applied between the first and second electrodes, the light transmitted through the liquid crystal layer is absorbed by the polarizing plate, thereby improving further the black display.

According to the liquid crystal device with the above-described configuration, an angle formed by the alignment direction of the molecules of the phase difference layer in the transmissive display portion and the alignment direction of the molecules of the phase difference layer in the reflective display portion may be about 67.5°. With such a configuration, the retardation of the liquid crystal layer in the reflective display portion can be configured to be about a quarter wavelength, thereby realizing the better black display.

According to the liquid crystal device with the above-described configuration, retardations of the liquid crystal layer in the transmissive display portion and the reflective display portion may be about a half wavelength and about a quarter wavelength, respectively. With such a configuration, a phase difference of a quarter wavelength occurring between the transmissive display portion and the reflective display portion can be solved. Accordingly, it is possible to simultaneously realize the black display in both the transmissive display portion and the reflective display portion.

According to the liquid crystal device with the above-described configuration, both the retardations of the phase difference layer in the transmissive display portion and in the reflective display portion may be about a half wavelength. With such a configuration, circularly polarized light or elliptically polarized light can be realized by the liquid crystal layer in the reflective display portion. In addition, when the reflected light is incident to the polarizing plate, the light becomes the linearly polarized light in the direction of the absorption axis. In this way, it is possible to realize a more reliable black display.

According to the liquid crystal device with the above-described configuration, the phase difference layer is formed by polymerizing liquid crystalline compounds. With such a configuration, it is easier to change the alignment direction in the transmissive display portion and the reflective display portion, thereby realizing the black display with less the light leakage.

According to another aspect of the invention, there is provided an electronic apparatus comprising the liquid crystal device according to the liquid crystal device with above-described configuration.

According to the above-described aspects of the invention, there is provided the liquid crystal device which can easily obtain the same advantage as that obtained in a case where the phase difference layer is formed only in the reflective display portion, and which can improve the wide viewing angle by further preventing the light leakage. As a result, it is possible to provide the electronic apparatus capable of further improving display quality at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. In the embodiments described below, as an example of a liquid crystal device, a thin film transistor (TFT) active matrix type transflective liquid device and an electronic apparatus using the liquid crystal device will be described. However, the invention is not limited thereto. Moreover, in order to enable easy description of elements shown in the accompanying drawings, the elements are appropriately shown with different scales and in different numbers from the actual ones.

First Embodiment

Figure 1:
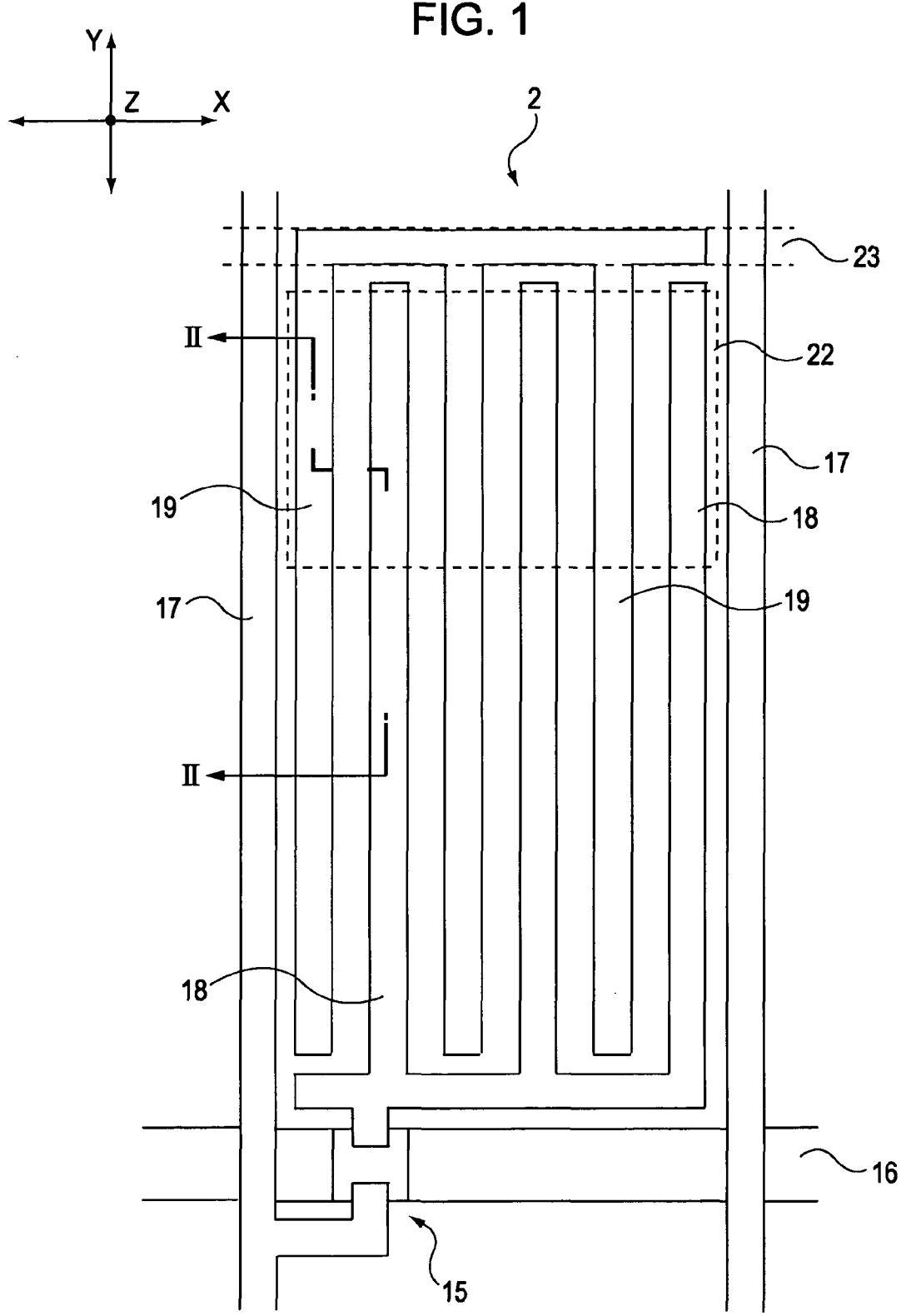
FIG. 1 is a schematic top view illustrating a liquid crystal device according to a first embodiment.
Figure 2:
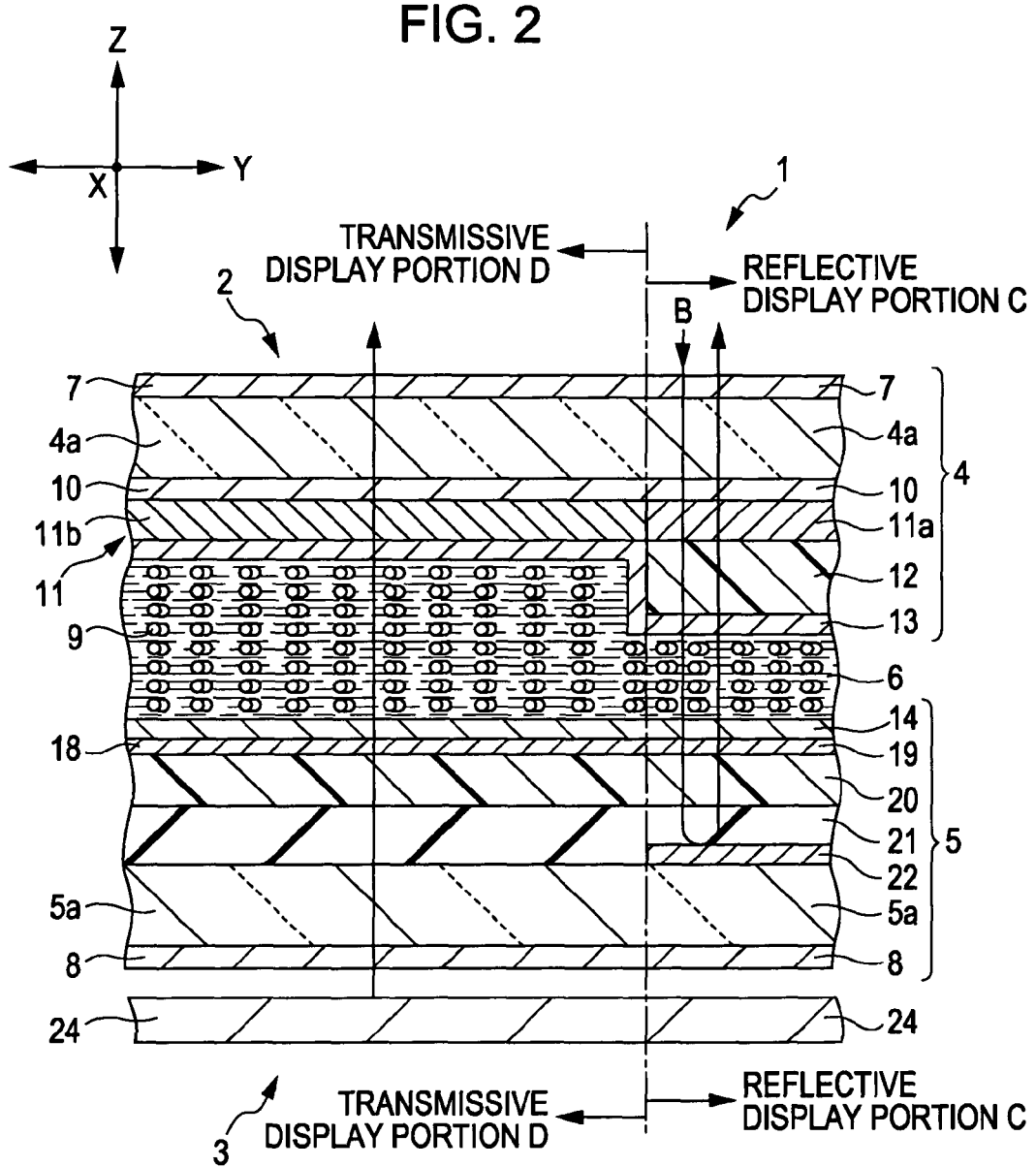
FIG. 2 is a schematic sectional view illustrating the liquid crystal device taken along the line A-A shown in FIG. 1.
Figure 3:
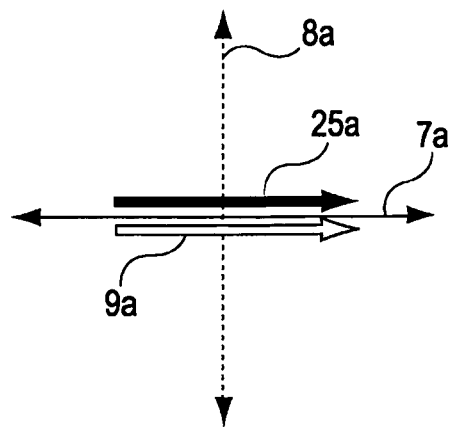
FIG. 3 is a diagram for explaining an absorption axis and a direction of liquid crystal molecules and molecules according to the first embodiment.

FIG. 1 is a schematic top view illustrating a liquid crystal device according to a first embodiment. FIG. 2 is a schematic sectional view illustrating the liquid crystal device taken along the line A-A shown in FIG. 1. FIG. 3 is a diagram for explaining an absorption axis of a polarizing plate and a direction of liquid crystal molecules and molecules according to the first embodiment. FIG. 1 shows a second substrate in which an alignment film is removed for descriptive convenience.

Configuration of Liquid Crystal Device

As shown in FIG. 2, a liquid crystal device 1 includes, for example, a liquid crystal panel 2, a flexible substrate (not shown) connected to the liquid crystal panel 2, an illuminating device 3 emitting illuminating light to the liquid crystal panel 2, and a case (not shown) holding the liquid crystal panel 2 and the illuminating device 3. In this case, in addition to the illuminating device 3, other supplementary devices can be added to the liquid crystal device 1, if necessary.

As shown in FIGS. 1 and 2, the liquid crystal panel 2 includes, for example, a first substrate 4 and a second substrate 5 bonded with one another through a seal member (not shown), and a liquid crystal layer 6 including nematic liquid crystal molecules interposed between the substrates.

The first substrate 4 and the second substrate 5 include a first substrate 4a and a second substrate 5a each formed of a plate member having a light transmitting property, for example, a glass, respectively. As shown in FIG. 2, a first polarizing plate 7 and a second polarizing plate 8 for polarizing incident light are bonded on the outer surfaces of the first substrate 4a and the second substrate 5a, respectively.

As shown in FIG. 3, a first absorption axis 7a of the first polarizing plate 7 is perpendicular to a second absorption axis 8a of the second polarizing plate 8. The absorption axis 7a of the first polarizing plate 7 is equal to an initial alignment direction 9a (hereinafter, simply referred to as "an alignment direction") as a first direction of liquid crystal molecules 9 of the liquid crystal layer 6. The first direction is an in-plane direction on a substrate surface.

As shown in FIG. 2, the first substrate 4a includes an alignment film 10 for allowing liquid crystalline compounds to be in mutually different alignment states in the reflective display portion and in the transmissive display portion, a phase difference layer 11 in which polymerized liquid crystal compounds are laminated so as to be formed in the reflective display portion and in the transmissive display portion, a layer thickness adjusting layer 12 formed in the reflective display portion, an alignment film 13 formed in the reflective display portion on the inner side (liquid crystal layer) thereof.

An alignment regulating force is applied to the alignment film 10 of the liquid crystalline compounds described above, using a rubbing process with which, for example, polyimide is formed in the reflective display portion and the transmissive display portion in different directions using a resist, or a photo-alignment technology.

The phase difference layer 11 is formed on the alignment film 10 (liquid crystal side) subjected to the rubbing process by laminating the polymerized liquid crystalline compounds and an giving them optically uniaxial property. In this way, the alignment direction of molecules 25 (liquid crystal molecules of the liquid crystalline compound having a polymerizable group) of the phase difference layer 11 in a reflective display portion 11a can be configured to be different from the alignment direction in a transmissive display portion 11b. For example, an angle formed by the alignment directions is about 67.5°.

The phase difference layer 11 is configured to have a film thickness or the like so that retardation, for example, becomes about a half wavelength in both the reflective display portion 11a and in the transmissive display portion 11b. As shown in FIG. 3, for example, a direction 25a of the molecules 25 is parallel to the alignment direction 9a of the liquid crystal molecules 9 (that is, which are parallel and their directions are the same) in a top view (for example, when the liquid crystal panel 2 is viewed from above).

The alignment film 13 is formed so as to be close to the liquid crystal layer in the first substrate 4a to cover the layer thickness adjusting layer 12 in the reflective display portion and the phase difference layer 11 in the transmissive display portion. For example, the alignment direction 9a of the liquid crystal molecule 9 is parallel to a direction of the absorption axis 7a of the first polarizing plate 7, as shown in FIG. 3.

As shown in FIGS. 1 and 2, for example, the second substrate 5a includes an alignment film 14, TFTs 15, gate lines 16 electrically connected to the TFTs 15, source lines 17, pixel electrodes 18 as first electrodes, common electrodes 19 disposed to be separated from the pixel electrodes 18 as second electrodes, a resin layer 20, an insulating layer 21, a reflective layer 22, common electrode lines 23 stacked on the liquid crystal layer.

The gate lines 16 and the source lines 17 are arranged alternately with one another, for example, as shown in FIG. 1. A plurality of the gate lines 16 are formed parallel to one another in an X direction so as to be close to the liquid crystal layer in the second substrate 5a. In addition, a plurality of the source lines 17 are formed parallel to a Y direction so as to be close to the liquid crystal layer in the second substrate 5a.

As shown in FIG. 1, the pixel electrodes 18 are formed in a lattice pattern, for example, on the liquid crystal side of the resin layer 20. In addition, the pixel electrodes 18 are electrically connected to the TFTs 15.

The common electrodes 19 are formed in the lattice pattern, for example, close to the liquid crystal side of the resin layer 20 so as to be separated from and intersect with the pixel electrodes 18. In addition, the common electrodes 19 are electrically connected to the common electrode lines 23 through through-holes (not shown) formed in the resin layer 20 and the insulating layer 21. When a voltage is applied to the pixel electrodes 18 and the common electrodes 19, a transverse electric field is formed between the two lattice patterns. The pixel electrodes 18 and the common electrodes 19 are made of, for example, indium tin oxide (ITO).

For example, as shown in FIG. 1, the reflective layer 22 is formed between the second substrate 5a and the insulating layer 21 so as to overlap with parts of the pixel electrodes 18 and the common electrodes 19 in a top view, which are configured to intersect with one another in pixels surrounded by the gate lines 16 and the source lines 17.

The reflective layer 22 is made of a material such as aluminum which reflects light. As shown in FIG. 2, incident light B (B in FIG. 2) is reflected so that a reflective display portion C (C in FIG. 2) is configured. In addition, a region in which the pixel electrodes 18 and the common electrodes 19 are formed, separate from the reflective display portion C is a transmissive display portion D (D in FIG. 2) in which light is transmitted. The transmissive display portion D allows light from the illuminating device 3 described below to be transmitted and to be emitted from the first polarizing plate 7.

For example, as shown in FIG. 2, an alignment film 14 is formed so as to cover the pixel electrodes 18 and the common electrodes 19 and to be the closest to the liquid crystal layer in the second substrate 5a. The alignment direction of the liquid crystal molecules 9 is configured to be parallel to the absorption axis 7a of the first polarizing plate 7, for example, as shown in FIG. 3.

On the sides of the liquid crystal layer adjacent to the first substrate 4a and the second substrate 5a, an underlying layer, a coloring layer, a light-shielding layer and the like (not shown), are formed, if necessary.

For example, as shown in FIG. 2, the illuminating device 3 is a backlight unit for supplying light to the liquid crystal panel 2 and includes a light source, a light guide plate 24, and the like (not shown).

Operation of Liquid Crystal Device

Next, how light travels inside the liquid crystal panel in operation of the liquid crystal device 1 with the above-described configuration, and more particularly, a black display of the transmissive display portion D will be described.

Figure 4:
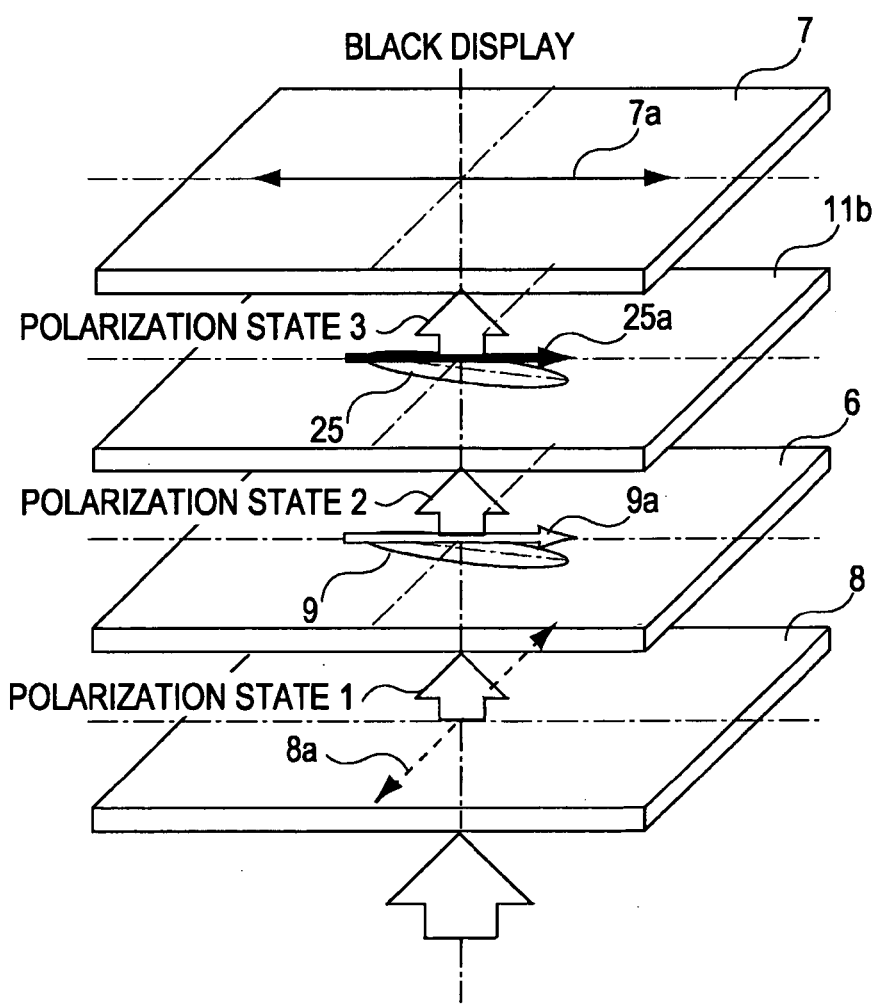
FIG. 4 is a diagram for explaining how light travels according to the first embodiment.
Figure 5:
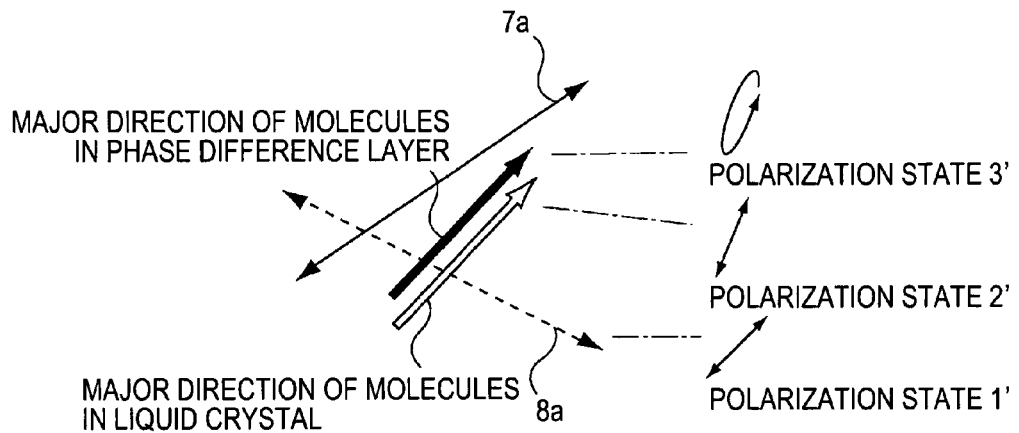
FIG. 5 is a diagram for explaining the absorption axis and the direction when a liquid crystal panel is viewed in an oblique direction according to the first embodiment.

FIG. 4 is a diagram for explaining how light travels in the first and second polarizing plates, the liquid crystal layer, and the phase difference layer according to the first embodiment. FIG. 5 is a diagram for explaining the absorption axis of the polarizing plate, the liquid crystal molecules, and a direction of the molecules of the phase difference layer when a liquid crystal panel is viewed in an oblique direction according to the first embodiment.

For example, when a voltage is not applied to the pixel electrodes 18 and the common electrodes 19, as shown in FIG. 2, the light incident from the light guide plate 24 of the illuminating device 3 to the second polarizing plate 8, as shown in FIG. 4, becomes linearly polarized light in a direction substantially perpendicular to the direction of the absorption axis 8a of the second polarizing plate 8 (polarization state 1).

When the light in polarization state 1 is incident to the liquid crystal layer 6, as shown in FIG. 4, the initial alignment direction 9a of the liquid crystal molecules 9 is perpendicular to the direction of the absorption axis 8a of the second polarizing plate 8. Accordingly, the incident linearly polarized light is not affected and is transmitted so as to be incident to the phase difference layer 11 (polarization state 2).

Subsequently, when the light in polarization state 2 is incident to the phase difference layer 11, as shown in FIG. 4, a director 25a of the molecules 25 of the phase difference layer 11 is parallel to the alignment direction 9a of the liquid crystal molecules 9. Accordingly, the incident linearly polarized light in the alignment direction 9a of the liquid crystal molecules 9 without being affected is incident to the first polarizing plate 7 (polarization state 3).

When the light in polarization state 3 is incident to the first polarizing plate 7, as shown in FIG. 4, the direction of the absorption axis 7a of the first polarizing plate 7 is equal to the polarization direction of the linearly polarized incident light. The incident light is absorbed, and thus not emitted from the first polarizing plate 7 to realize black display.

The light described above has been described in a top view, but when obliquely viewed, the light can be described from a different viewpoint. Hereinafter, how the light travels in an oblique view will be described.

First, the liquid crystal molecules 9 and the molecules 25 of the phase difference layer 11 have a predetermined pretilt angle with respect to, for example, a first substrate surface so as to be inclined. For example, the pretilt angle of the molecules 25 is about 3°.

For example, as shown in FIG. 5, the alignment direction 9a of the liquid crystal molecules 9 is inclined by the pretilt angle in the oblique view from the upper side, compared to in the top view. In addition, the light becomes linearly polarized light with a deviated axis. As a result, polarization state 2 becomes polarization state 21.

At this time, the director 25a of the molecules 25 in the transmissive display portion 11b of the phase difference layer 11 is parallel to the alignment direction 9a of the liquid crystal molecules 9 in the top view. Accordingly, as shown in FIG. 5, in the oblique view, an angle formed by a direction of the major axis of the molecules 25 and the direction of the major axis of the liquid crystal molecules 9 becomes small.

With such a configuration, the light emitted from the phase difference layer 11 becomes elliptically polarized light. However, the minor axis of the ellipse is considerably smaller than the major axis and light leaked from the first polarizing plate 7 can be neglected. Accordingly, light leakage in the dark display in an oblique direction can be further prevented, thereby improving the wide viewing angle.

For example, in terms of the Poincare sphere, the fact that the angle formed by the direction of the major axis of the molecules 25 and the polarization axis of the linearly polarized light being transmitted through the liquid crystal layer 6 becomes smaller means that the sphere is a little swollen from the equator due to the polarization change caused by the phase difference layer 11 in the equator, thereby becoming elliptically polarized light close to linearly polarized light.

The operation of the liquid crystal device 1 has been described.

According to the above-described embodiment, the phase difference layer 11 is formed in the transmissive display portion C and the reflective display portion D of the liquid crystal layer in the first substrate 4 and the second substrate 5. Accordingly, it is possible to eliminate difficulty in patterning the phase difference layer 11 only in the reflective display portion in the known example, thereby reducing cost.

Since the alignment directions of the molecules 25 in the phase difference layer 11 are different in the transmissive display portion 11b and the reflective display portion 11a, effect of the phase difference layer 11 in the transmissive display portion D can be minimized.

At least in the transmissive display portion D, the director 25a of the molecules 25 in the phase difference layer 11 is parallel to the alignment direction 9a of the liquid crystal molecules 9 in the substrate surface. Accordingly, even when viewed in the oblique direction, the light leakage is reduced in the black display. For example, by allowing the director 25a to be parallel to the alignment direction 9a, in terms of the Poincare sphere, the sphere is less swollen from the equator due to the phase difference layer 11. In this way, the polarization state become an elliptical state to being a linear state, thereby further preventing the light leakage in the black display. Accordingly, it is possible to obtain a wider viewing angle property.

The absorption axis 7a of the first polarizing plate 7 is parallel to the alignment direction 9a of the liquid crystal molecules 9. Accordingly, when a voltage is not applied between the pixel electrodes 18 and the common electrodes 19, the light being transmitted through the liquid crystal layer 6 is absorbed by the first polarizing plate 7. As a result, a completely black display is possible.

An angle between the alignment direction of the molecules 25 in the phase difference layer 11 of the transmissive display portion D and the alignment direction of the reflective display portion C is about 67.5°. Accordingly, a retardation of the liquid crystal layer 6 in the reflective display portion C is about a quarter wavelength, thereby obtaining a better black display.

The retardation of the liquid crystal layer 6 is about a half wavelength in the transmissive display portion D and the retardation of the liquid crystal layer 6 is about a quarter wavelength in the reflective display portion C. Accordingly, it is possible to obtain the black display in both the transmissive display portion D and the reflective display portion C by adjusting a phase difference of a quarter wavelength caused between the transmissive display portion D and the reflective display portion C.

The retardation of the liquid crystal layer 11 is about a half wavelength in both the transmissive display portion D and the reflective display portion C. Accordingly, the light in the reflective display portion C is made to become circularly polarized light or elliptically polarized light by the liquid crystal layer 6. In addition, when the light is reflected and incident to the first polarizing plate 7, the light becomes the linearly polarized light in the direction of the absorption axis. In this way, it is possible to more reliably obtain the black display.

The phase difference layer 11 is formed of the polymerized liquid crystalline compound. Accordingly, since it is easy to change the alignment direction in the transmissive display portion D and the reflective display portion C, it is possible to obtain the black display with no light leakage.

Hereinafter, examples will be described in order to discuss a wide viewing angle characteristic of the liquid crystal device according to the invention.

Example 1

Figure 6:
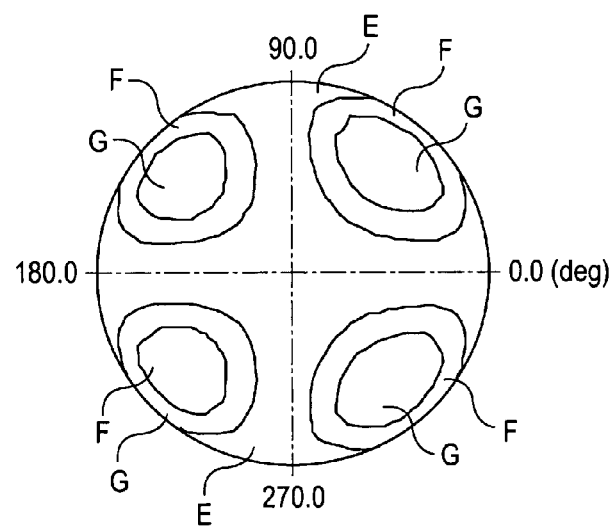
FIG. 6 is a diagram for explaining a viewing angle characteristic according to a first example.

FIG. 6 is a diagram for explaining the viewing angle characteristic in a black display. In FIG. 6, the center of a circle corresponds to the front side of the liquid crystal device (in a right top view). In addition, the more a view is moved away from the center, the more an angle increases. A region E is a region where the light leakage is the smallest and regions F, G, H and I (oblique lines in the drawing) are regions where the light leakage increases. That is, the region I is a region where the light leakage is the largest. Another viewing angle characteristic that will be described below is also applied.

In Example 1, as shown in FIG. 6, the liquid crystal device 1 is used. That is, the direction of the absorption axis 7a of the first polarizing plate 7 shown in FIG. 3 is parallel to the alignment direction 9a of the liquid crystal molecules 9 and the director 25a of the molecules 25 in the phase difference layer 11 is parallel to the alignment direction 9a of the liquid crystal molecules 9 in the top view. It was proven that the light leakage was considerably small even in the regions G located in four different directions away from the center and it was possible to obtain the wide viewing angle characteristic in which the light leakage in the black display is small.

Example 2

Figure 7:
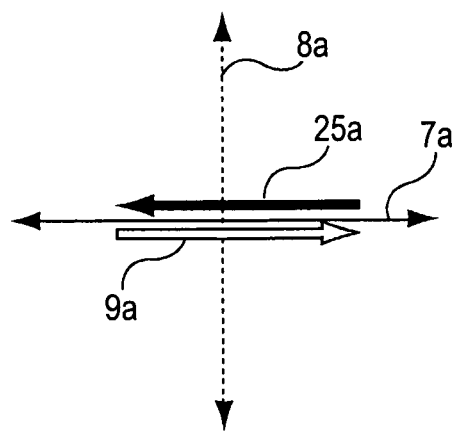
FIG. 7 is a diagram for explaining an absorption axis and a direction of liquid crystal molecules and molecules according to a second example.
Figure 8:
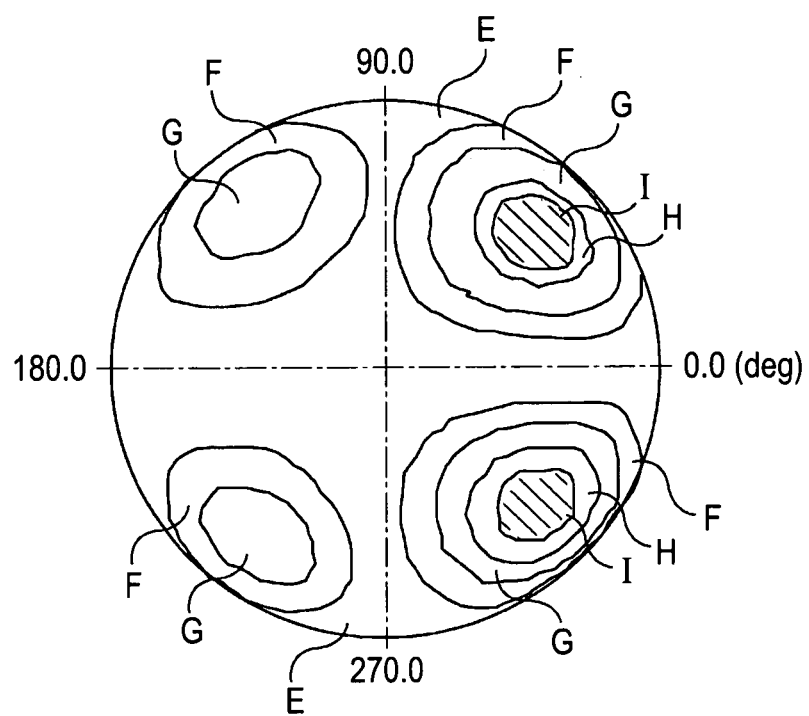
FIG. 8 is a diagram for explaining the viewing angle characteristic according to the second example.
Figure 9:
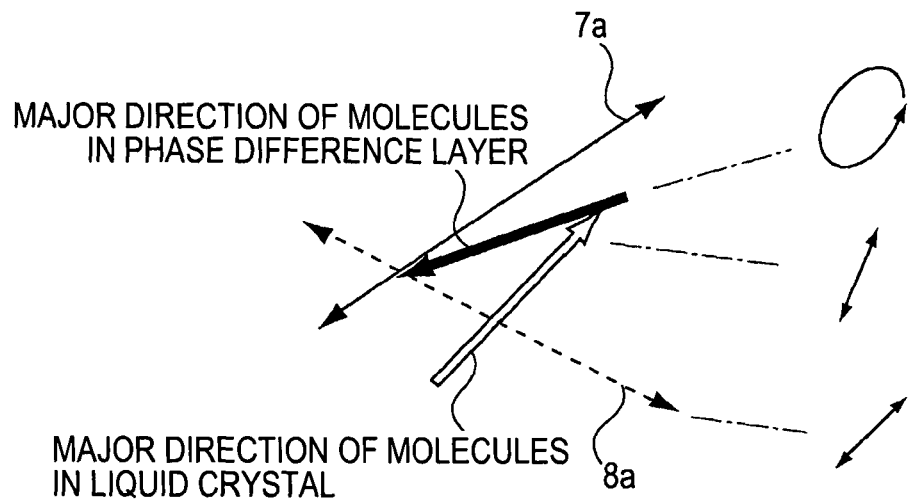
FIG. 9 is a diagram for explaining the absorption axis and the direction when a liquid crystal panel is viewed in an oblique direction according to the second example.

FIG. 7 is a diagram for explaining the absorption axis of the polarizing plate and the directions of the liquid crystal molecules and the molecules in the phase difference layer. FIG. 8 is a diagram for explaining the viewing angle characteristic when the direction of the molecules in the phase difference layer is aligned in a reverse direction. FIG. 9 is a diagram for explaining the absorption axis of the polarizing plate and the directions of the liquid crystal molecules and the molecules in the phase difference layer when viewed in the oblique direction.

Example 2 is different from Example 1 in that there is provided a liquid crystal device in which the director 25a of the molecules 25 in the phase difference layer 11, as shown in FIG. 7, is directed to be anti-parallel (parallel in an opposite direction) to the alignment direction 9a of the liquid crystal molecules 9 in the top view.

In Example 2, as shown in FIG. 8, strong light leakage I occurred in two regions located away from the center on the right side, but weak light leakage G just occurred in two regions located away from the center on the left side. Accordingly, a result obtained in Example 2 was not better than that obtained in Example 1, but it was proven that the light leakage was prevented to some extent, thereby obtaining the wide viewing angle characteristic.

The reason the wide viewing angle characteristic in Example 2 is not better than that in Example 1 is that, as shown in FIG. 9, the anti-parallel major direction of the molecules 25 in the phase difference layer 11 seems to have a large angle from the linearly polarized light deviated in the oblique view by change in polarization change in the liquid crystal layer 6. In terms of the Poincare sphere, the sphere is swollen from the equator to approximately circularly polarized light. That is, that is considered to be because considerable light must leak from the first polarizing plate 7 in order for the light as elliptically polarized light close to the circularly polarized light to be incident to the first polarizing plate 7.

Example 3

Figure 10:
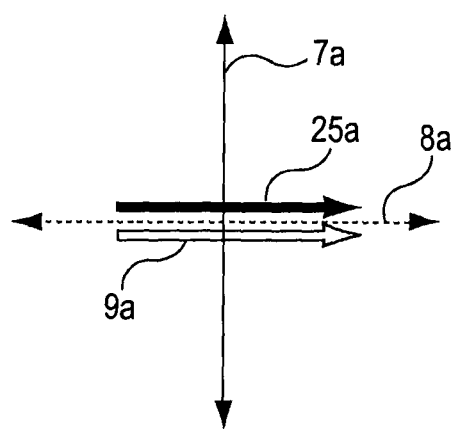
FIG. 10 is a diagram for explaining an absorption axis and a direction of liquid crystal molecules and molecules according to a third example.
Figure 11:
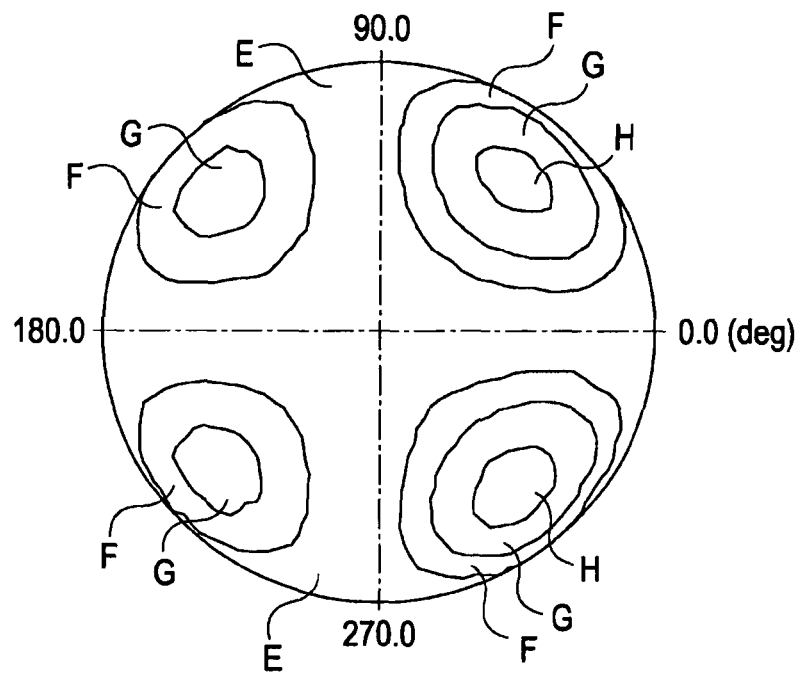
FIG. 11 is a diagram for explaining the viewing angle characteristic according to the third example.

FIG. 10 is a diagram for explaining the absorption axis of the polarizing plate and the directions of liquid crystal molecules and the molecules in the phase difference layer. FIG. 11 is a diagram for explaining the viewing angle characteristic when the absorption axes of the first and second polarizing plates are formed vice versa.

Example 3 is different from Example 1 in that, as shown in FIG. 10, the direction of the absorption axis 7a of the first polarizing plate 7 of the liquid crystal device 1 is perpendicular to the alignment direction 9a of the liquid crystal molecules 9 and the direction of the absorption axis 8a of the second polarizing plate 8 is parallel to the alignment direction 9a of the liquid crystal molecules 9.

In Example 3, as shown in FIG. 11, slightly strong light leakage H occurred in two regions away from the center on the right side, but weak light leakage G just occurred in two regions away from the center on the left side. Accordingly, a result obtained in Example 3 was not better than that obtained in Example 1, but it was proven that the light leakage was considerably prevented, thereby obtaining the wide viewing angle characteristic.

Example 4

Figure 12:
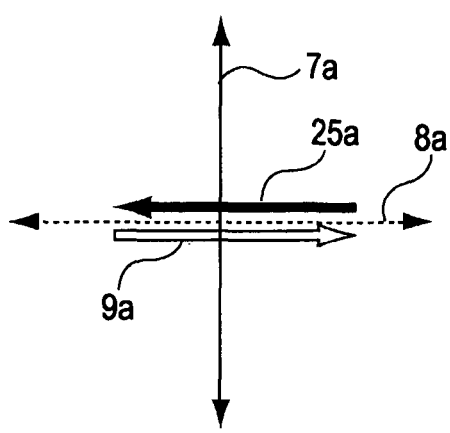
FIG. 12 is a diagram for explaining an absorption axis and a direction of liquid crystal molecules and molecules according to a fourth example.
Figure 13:
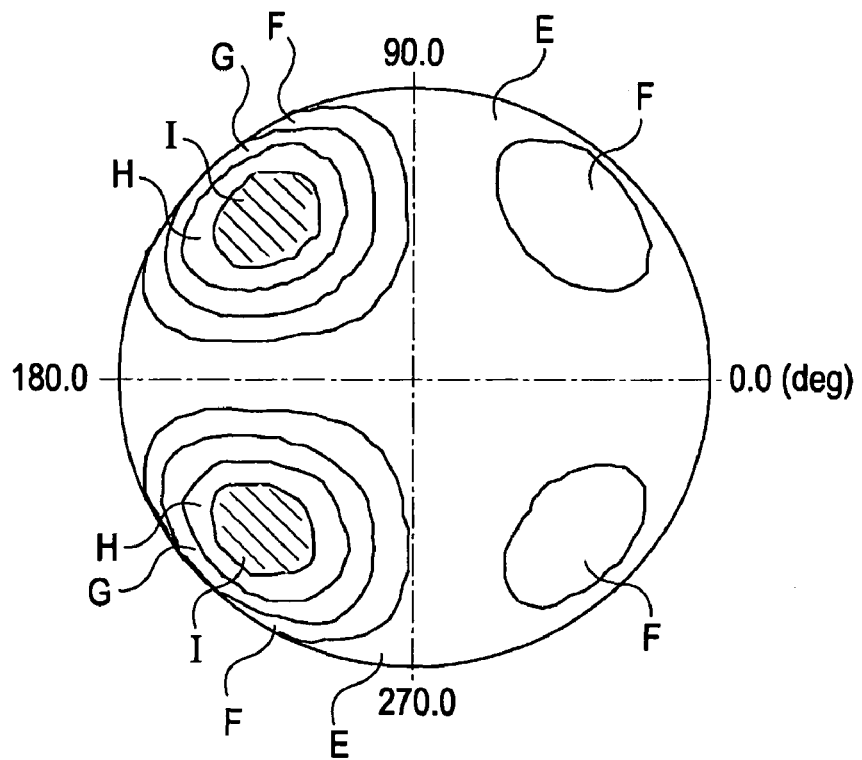
FIG. 13 is a diagram for explaining the viewing angle characteristic according to the fourth example.

FIG. 12 is a diagram for explaining the absorption axis of the polarizing plate and the direction of the liquid crystal molecules and molecules in the phase difference layer. FIG. 13 is a diagram for explaining the viewing angle characteristic when the direction of the molecules in the phase difference layer is directed oppositely and the absorption axes of the first and the second polarizing plates are configured to be formed vice versa.

Example 4 is different from Example 1 in that, as shown in FIG. 12, the direction of the absorption axis 7a of the first polarizing plate 7 of the liquid crystal device 1 is perpendicular to the alignment direction 9a of the liquid crystal molecules 9, the direction of the absorption axis 8a of the second polarizing plate 8 is parallel to the alignment direction 9a of the liquid crystal molecules 9, and the director 25a of the molecules 25 of the phase difference layer 11 is anti-parallel to the alignment direction 9a of the liquid crystal molecules 9 in the top view.

In Example 3, as shown in FIG. 13, the strong light leakage I occurred in two regions away from the center on the left side, but weak light leakage F just occurred in two regions away from the center on the right side. Accordingly, a result obtained in Example 4 was not better than that obtained in Example 1, but it was proven that the light leakage was prevented to some extent, thereby obtaining the wide viewing angle characteristic.

Comparative Example 1

Figure 14:
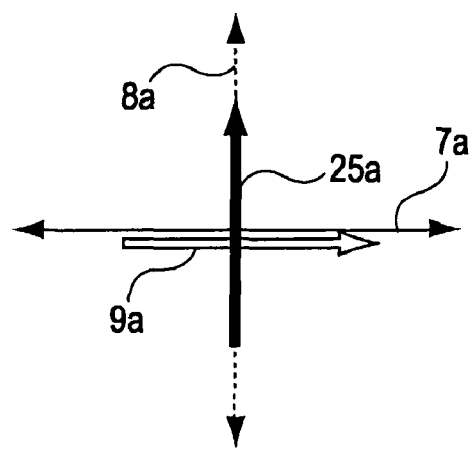
FIG. 14 is a diagram for explaining an absorption axis and a direction of liquid crystal molecules and molecules according to a first comparative example.
Figure 15:
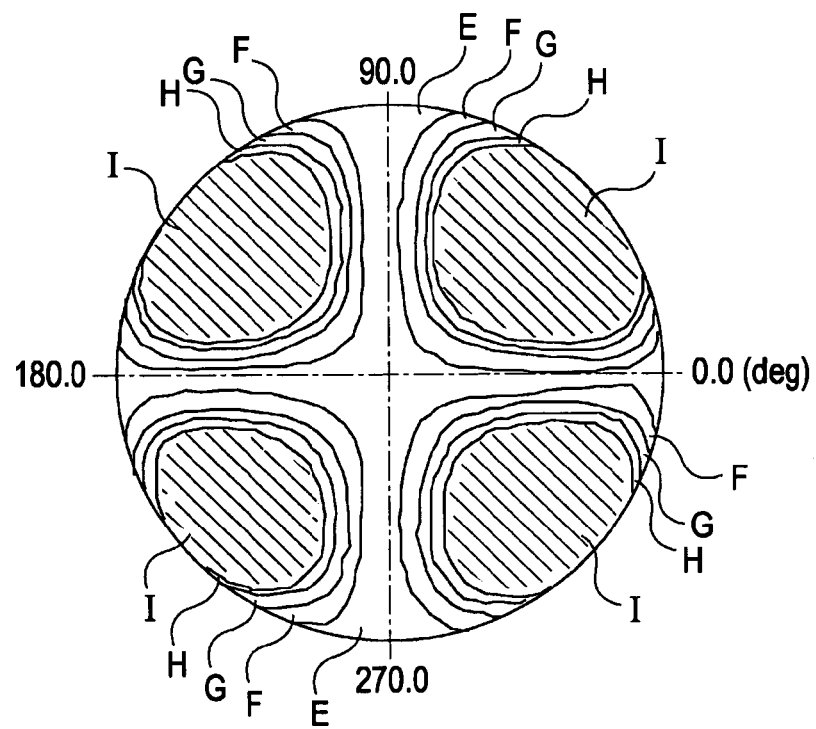
FIG. 15 is a diagram for explaining the viewing angle characteristic according to the first comparative example.

FIG. 14 is a diagram for explaining the absorption axis of the polarizing plate and the direction of liquid crystal molecules and molecules in the phase difference layer. FIG. 15 is a diagram for explaining the viewing angle characteristic when the direction of the molecules in the phase difference layer is perpendicular to the direction of the liquid crystal molecules.

Comparative Example 1 is different from Example 1 in that there is provided a liquid crystal device in which the director 25a of the molecules 25 in the phase difference layer 11, as shown in FIG. 14, is perpendicular to the alignment direction 9a of the liquid crystal molecules 9 in the top view.

In Comparative Example 1, as shown in FIG. 15, the strong light leakage I occurred in four regions on the right and the left sides until regions close to the center. Accordingly, the light leakage in Comparative Example 1 was more than that in Examples 1 to 4. It was proven that the wide viewing angle characteristic in the black display of a transverse electric field mode may deteriorate if the director 25a of the molecules 25 in the phase difference player 11 is configured to be perpendicular to the alignment direction 9a of the liquid crystal molecules 9 in the top view.

Comparative Example 2

Figure 16:
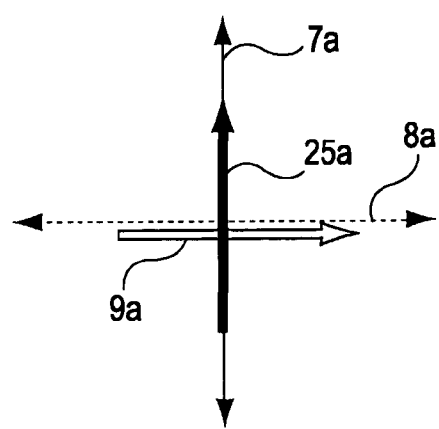
FIG. 16 is a diagram for explaining an absorption axis and a direction of liquid crystal molecules and molecules according to a second comparative example.
Figure 17:
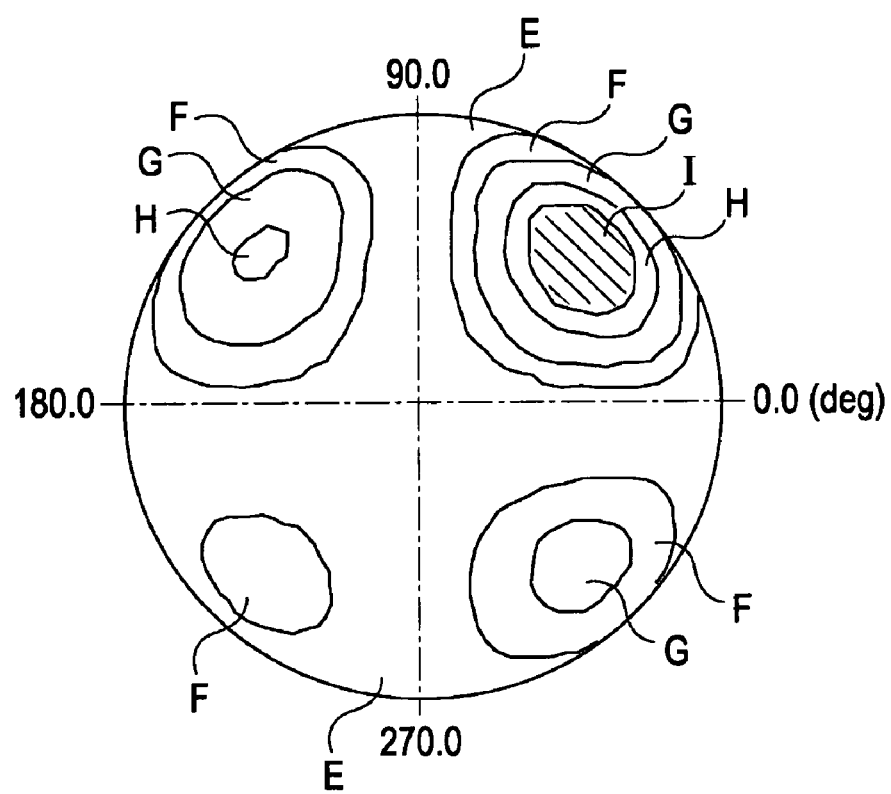
FIG. 17 is a diagram for explaining the viewing angle characteristic according to the second comparative example.

FIG. 16 is a diagram for explaining the absorption axis of the polarizing plate and the direction of the liquid crystal molecules and the molecules in the phase difference layer. FIG. 17 is a diagram for explaining the viewing angle characteristic when the direction of the molecules in the phase difference layer is perpendicular to the direction of the liquid crystal molecules and the absorption axes of the first and second polarizing plates are formed vice versa.

Comparative Example 2 is different from Example 1 in that, as shown in FIG. 17, there is provided a liquid crystal device in which the direction of the absorption axis 7a of the first polarizing plate 7 of the liquid crystal device 1 is perpendicular to the alignment direction 9a of the liquid crystal molecules 9, the absorption axis 8a of the second polarizing plate 8 is parallel to the alignment direction 9a of the liquid crystal molecules 9, and the director 25a of the molecules 25 in the phase difference layer 11 is perpendicular to the alignment direction 9a of the liquid crystal molecules 9 in the top view.

In Comparative Example 2, as shown in FIG. 17, the strong light leakage I or the slightly strong light leakage H occurred in two regions away from the center on the upper side. The light leakage in Comparative Example 2 was more than that in Example 1 or 3, even though the light leakage in Comparative Example 2 was less than that in Comparative Example 1. In addition, it was proven that the wide viewing angle characteristic in the black display of the transverse electric field mode may deteriorate if the director 25a of the molecules 25 in the phase difference layer 11 was perpendicular to the alignment direction 9a of the liquid crystal molecules 9 in the top view.

Among Examples 1 to 4 and Comparative Examples 1 and 2, the most example showing the least light leakage and the most wide viewing angle characteristic is Example 1, the next most example is Example 3 and Comparative Example 2, the next is Examples 2 and 4. In addition, an example showing the most light leakage and the least wide viewing angle characteristic is Comparative Example 1.

As described above, in order to allow the light leakage to be smaller in the black display of the transverse electric field, it is desirable that the director 25a of the molecules 25 in the phase difference layer 11 is parallel to the alignment direction 9a of the liquid crystal molecules 9 in the top view and the direction of the absorption axis 7a of the first polarizing plate 7 is parallel to the alignment direction 9a of the liquid crystal molecules 9.

When the director 25a of the molecules 25 in the phase difference layer 11 is parallel to the alignment direction 9a of the liquid crystal molecules 9 in the top view, the direction of the absorption axis 7a of the first polarizing plate 7 is perpendicular to the alignment direction 9a of the liquid crystal molecules 9 and the direction of the absorption axis 8a of the second polarizing plate 8 is parallel to the alignment direction 9a of the liquid crystal molecules 9 (like Example 3), it was proven that the light leakage is considerably small and the wide viewing angle characteristic can be obtained.

Alternatively, when the director 25a of the molecules 25 in the phase difference layer 11 is unavoidably configured to perpendicular to the alignment direction 9a of the liquid crystal molecules 9 in the top view, the direction of the absorption axis 7a of the first polarizing plate 7 can be configured to be perpendicular to the alignment direction 9a of the liquid crystal molecules 9 and the direction of the absorption axis 8a of the second polarizing plate 8 can be configured to be parallel to the alignment direction 9a of the liquid crystal molecules 9. In this case, it was proven that a considerable good wide viewing angle in the black display of the transverse electric field mode can be obtained.

Second Embodiment

Next, a liquid crystal device according to a second embodiment of the invention will be described. The second embodiment is different from the first embodiment in that an insulating layer is formed between the pixel electrodes and the common electrodes, which will be described. In the following description, the same reference numerals are given to the same components as those in the first embodiment and the description will be omitted or simplified.

Figure 18:
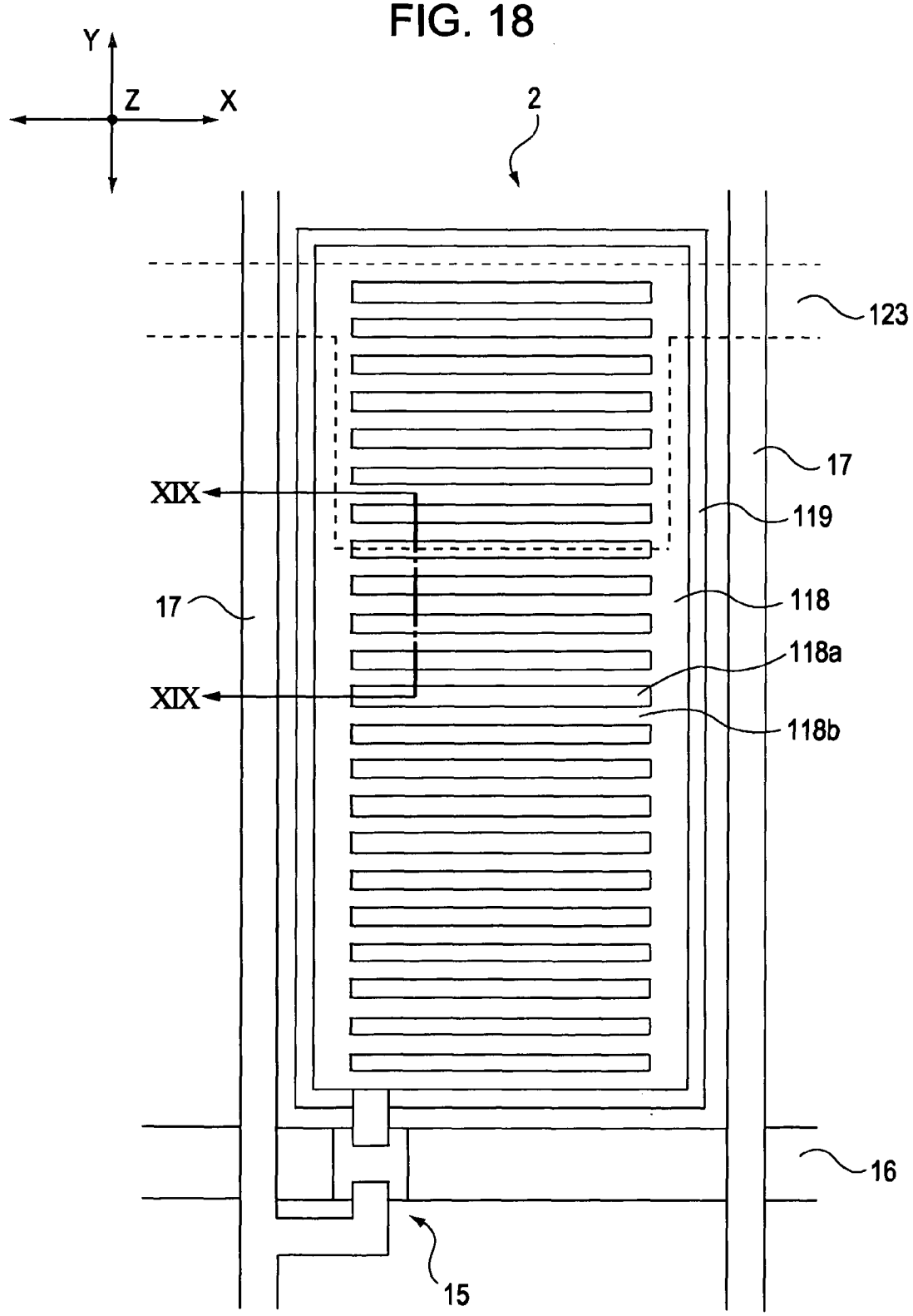
FIG. 18 is a schematic top view illustrating a liquid crystal device according to a second embodiment.
Figure 19:
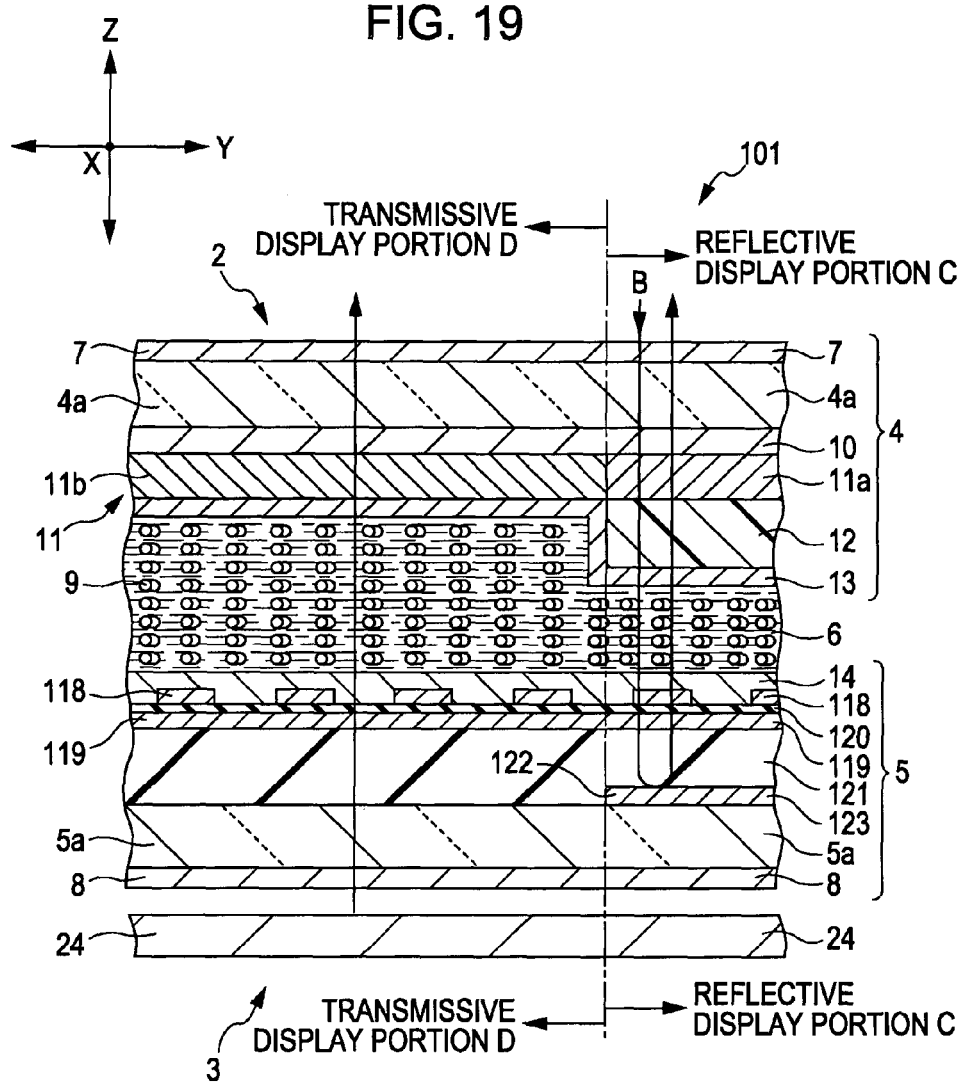
FIG. 19 is a schematic sectional view illustrating the liquid crystal device taken along the line J-J shown in FIG. 18.

FIG. 18 is a schematic top view illustrating a liquid crystal device according to a second embodiment of the invention. FIG. 19 is a schematic sectional view illustrating the liquid crystal device taken along the line J-J shown in FIG. 18. FIG. 18 shows a second substrate in which an alignment film is removed for descriptive convenience.

Configuration of Liquid Crystal Device

In a liquid crystal device 101, for example, as shown in FIGS. 18 and 19, a first base 5a includes an alignment film 14 on a side of a liquid crystal layer, TFTs 15, gate lines 16 electrically connected to the TFTs 15, source lines 17, pixel electrodes 118 as first electrodes, an insulating layer 120, common electrodes 119 as second electrodes disposed so as to overlap with the pixel electrodes 118 through the insulating layer 120, insulating layer 121, common electrode lines 123 electrically connected to the common electrodes 119, etc.

For example, as shown in FIG. 19, some of the common electrode lines 123 overlap with the second substrate 5a on the side of the liquid crystal layer through the common electrodes 119 and the insulating layer 121. In addition, the common electrode lines 123 are electrically connected to the common electrodes 119 through through-holes (not shown) formed in the insulating layer 121. Moreover, the common electrode lines 123 are made of, for example, aluminum and as shown in FIG. 19, a part on which incident light B is reflected is a reflective layer 122. Accordingly, a reflective display portion C is formed in a region in which the common electrode lines 123 overlap with the common electrodes 119 and the pixel electrodes 118. Of course, a reflective layer may be formed separately from the common electrode lines 123.

As shown in FIG. 19, some of the common electrodes 119 overlap with, for example, the common electrode lines 123 through the insulating layer 121. In addition, the common electrodes 119 made of, for example, indium tin oxide (ITO) are formed on the insulating layer 121 on the side of the liquid crystal layer so as to substantially overlap with the pixel electrodes 118 through the insulating layer 120.

As shown in FIGS. 18 and 19, for example, the pixel electrodes 118 include slits 118a parallel to the gate lines 16 and extension portion 118b for forming the slits 118a. Accordingly, when a voltage is applied to the pixel electrodes 118 and the common electrodes 119, an electric field considerably curved toward the common electrodes 119 is formed through the insulating layer 120 by the extension portions 118b and the slits 118a.

The pixel electrodes 118 are not limited to the case where the slits are formed in the above-described manner, but may be formed in a lattice pattern on a side of the liquid crystal layer in the insulating layer 120.

Operation of Liquid Crystal Device

Next, the way how light travels in a liquid crystal panel when the liquid crystal device 101 with the above-described configuration operates is the almost same that according to the first embodiment, and thus will be omitted.

In this way, according to the second embodiment, the second substrate 5 is configured to have the insulating layer 120 between the pixel electrodes 118 and the common electrodes 119. Accordingly, when a voltage is applied, the electric field formed between the pixel electrodes 118 and the common electrodes 119 is considerably curved and the alignment direction of the liquid crystal molecules 9 in the electrodes is controlled. In this way, it is possible to obtain the wider viewing angle characteristic.

Third Embodiment

Electronic Apparatus

Next, an electronic apparatus including the above-described liquid crystal device 1 or 101 will be described according to a third embodiment of the invention.

Figure 20:
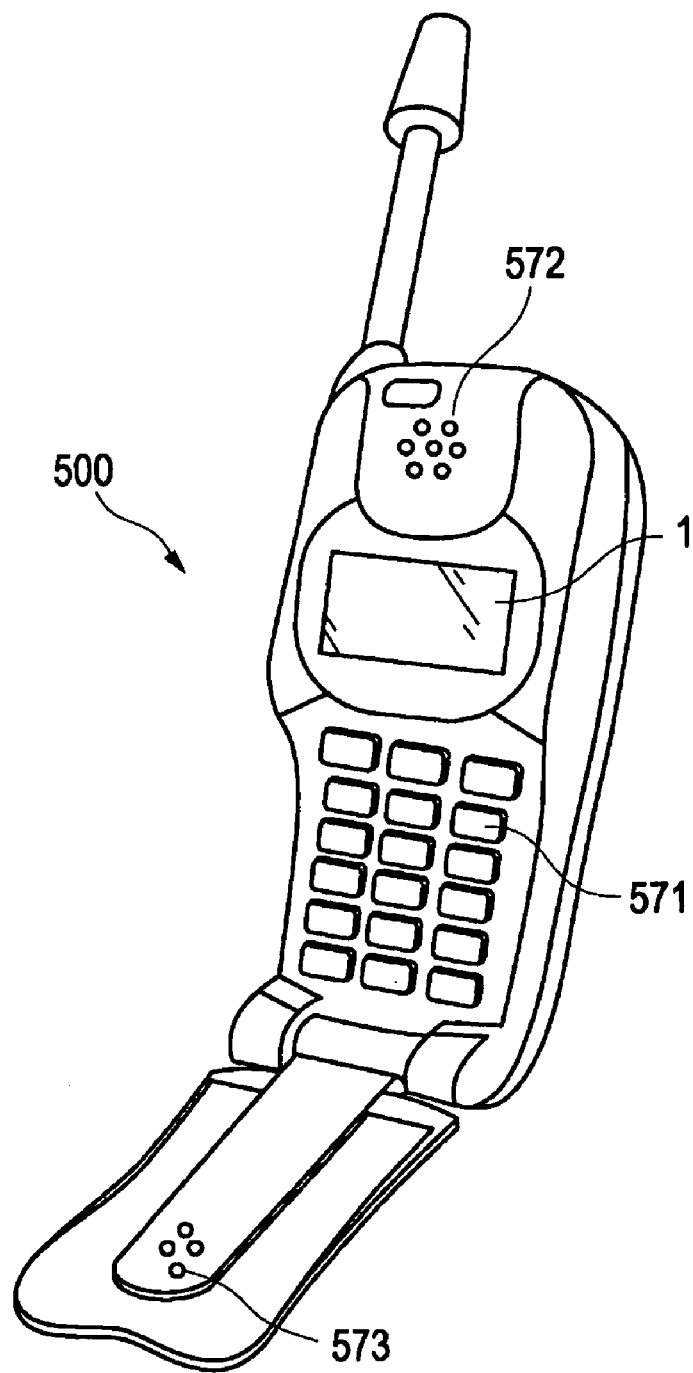
FIG. 20 is a schematic diagram illustrating an outer appearance of a cellular phone according to a third embodiment.
Figure 21:
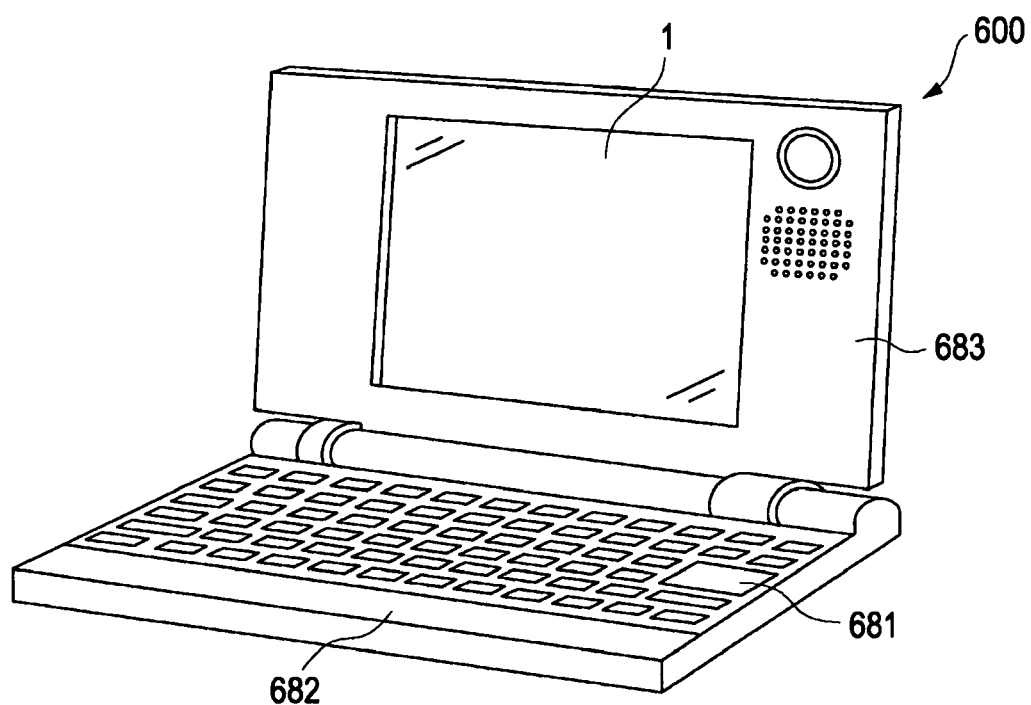
FIG. 21 is a schematic diagram illustrating an outer appearance of a personal computer according to a third embodiment.

FIG. 20 is a schematic diagram illustrating an outer appearance of a cellular phone according to a third embodiment of the invention. FIG. 21 is a schematic diagram illustrating an outer appearance of a personal computer.

For example, as shown in FIG. 20, a cellular phone 500 includes, for example, the liquid crystal device 1 on an outer frame with a plurality of operation buttons 571, an ear piece 572, and a mount piece 573.

As shown in FIG. 21, a personal computer 600 includes a main body 682 with keyboards 681 and a liquid crystal display portion 683. The liquid crystal display portion 683 includes, for example, the liquid crystal device on an outer frame 1.

The electronic apparatuses, even though other elements except for the liquid crystal device 1 are not shown, include various circuits such as a display information output source or a display information processing circuit, a power source circuit for supplying electric power to the circuits, etc.

For example, in the personal computer 600, display images are displayed on the liquid crystal device 1 by supplying display signals generated by a signal generating unit on the basis of information input from the keyboards 681.

According to the third embodiment, there is provided the liquid crystal device 1 which can easily obtain the same effect as that obtained in a case where the phase difference layer is formed only in the reflective display portion C, and improve the wide viewing angle by further preventing the light leakage in the black display.

In particular, since the wide viewing angle and high color reproduction have been demanded in the portable electronic apparatuses described above, the present invention which can realize high display quality at low cost is advantageous.

Examples of the electronic apparatus include a touch panel mounted with another liquid crystal device, a projector, a monitor direct view-type video tape recorder, a car navigation apparatus, a pager, an electronic pocket book, a calculator, and the like. In addition, it is needless to say that as a display portion of the various electronic apparatuses, for example, the liquid crystal device 1 or 101 described above can be applied.

The invention is not limited to the above-described embodiment, but may be modified to various forms in the range of technique spirit of the invention.

For example, in the above-described embodiment, as an example of the liquid crystal device, a thin film transistor element active matrix-type liquid crystal device has been described, but the invention is not thereto. For example, a thin film diode element active matrix-type or passive matrix-type liquid crystal device may be used. Even in the various types of liquid crystal device, since the light leakage in the black display is small, the wide viewing angle characteristic can be improved.

What is claimed is:

1. A liquid crystal device comprising: a liquid crystal layer interposed between a first substrate and a second substrate; a plurality of pixels each having a transmissive display portion and a reflective display portion; and first and second electrodes formed on the second substrate;
    liquid crystal molecules in the liquid crystal layer are aligned in a first direction in a plane of the substrate; and
    a phase difference layer having molecules, which are inclined in the plane of the first or second substrate and are aligned in directions different from one another in the transmissive display portion and the reflective display portion, is formed on a surface of the first or second substrate opposed to the liquid crystal layer;
    wherein a director of the molecules of the phase difference layer is aligned in a second direction parallel to the first direction at least in the plane of the transmissive display portion;
    wherein an angle formed by the alignment direction of the molecules of the phase difference layer in the transmissive display portion and the alignment direction of the molecules of the phase difference layer in the reflective display portion is about 67.5°.

2. The liquid crystal device according to claim 1, wherein a direction of the molecules in the phase difference layer inclined in the plane of the surface of the first or second substrate is substantially equal to that of the liquid crystal molecules in the liquid crystal layer inclined in the plane of the surface of the first or second substrate.

3. The liquid crystal device according to claim 1, wherein the first substrate has a polarizing plate on the surface opposed to the liquid crystal layer and wherein an absorption axis of the polarizing plate is parallel to the first direction.

4. The liquid crystal device according to claim 1, wherein retardations of the liquid crystal layer in the transmissive display portion and the reflective display portion are about a half wavelength and about a quarter wavelength, respectively.

5. The liquid crystal device according to claim 1, wherein both the retardations of the phase difference layer in the transmissive display portion and in the reflective display portion are about a half wavelength.

6. The liquid crystal device according to claim 1, wherein the phase difference layer is formed by polymerizing liquid crystalline compounds.

* * * * *